United States Patent [19]

Nikitin et al.

[11] 4,259,229
[45] Mar. 31, 1981

[54] PROCESS FOR PRODUCING COLORED POLYMER

[76] Inventors: Jury E. Nikitin, Revoljutsionnaya ulitsa 30/1, kv. 33; Jury I. Murinov, Revoljutsionnaya ulitsa 34, kv. 36; Gennady V. Leplyanin, ulitsa R. Zorge 31/2, kv. 14; Sagid R. Rafikov, ulitsa N. Mostovaya, 25, kv. 9; Lilia K. Bikchurina, prospekt Oktyabrya 133, kv. 25; Genrikh A. Tolstikov, prospekt Pushkina, 54, kv. 49; Valery P. Kazakov, ulitsa R. Zorge, 35/1, kv. 96; Edvard M. Battalov, ulitsa Frunze, 32; Vladimir S. Kolosnitsyn, Pervomaiskaya ulitsa, 10, kv. 47, all of Ufa; Lyalya N. Golodkova, prospekt Pobedy, 330, kv. 63, Chelyabinsk; Genrikh I. Izmailov, ulitsa Kirova, 86, kv. 48, Chelyabinsk; Gennady K. Markin, ulitsa Krasnoznamennaya, 1, kv. 4, Chelyabinsk, all of U.S.S.R.

[21] Appl. No.: 39,341

[22] Filed: May 16, 1979

[51] Int. Cl.$^3$ ............................................. C08K 5/00
[52] U.S. Cl. ............................... 260/42.21; 260/42.53
[58] Field of Search ...................................... 260/42.21

[56] References Cited

U.S. PATENT DOCUMENTS

| | | | |
|---|---|---|---|
| 3,216,958 | 11/1965 | Sheld | 260/42.21 X |
| 3,512,999 | 5/1970 | Dimroth | 260/42.21 X |
| 3,634,406 | 1/1972 | Doumaux | 260/42.21 X |
| 3,969,302 | 7/1976 | Wegmann et al. | 260/42.21 X |
| 4,014,866 | 3/1977 | Henning | 260/42.21 X |

FOREIGN PATENT DOCUMENTS

| | | | |
|---|---|---|---|
| 1294673 | 5/1969 | Fed. Rep. of Germany | 260/42.21 |
| 42-11485 | 6/1967 | Japan | 260/42.21 |

*Primary Examiner*—Lewis T. Jacobs
*Attorney, Agent, or Firm*—Steinberg & Raskin

[57] ABSTRACT

The process for producing a colored polymer according to the present invention comprises polymerization of a vinyl monomer in the presence of a radical-type initiator and a coloring agent which is a sulphoxide, tributylphosphate, diisoamylphosphonate, trialkyl/aryl/phosphinoxide, di-2-ethylhexylphosphoric acid complex of a dyed metal chloride or nitrate.

Said colored polymers find extensive use in various industries such as aircraft engineering, car manufacture, civil engineering, and the textile industry.

5 Claims, No Drawings

PROCESS FOR PRODUCING COLORED POLYMER

The present invention relates to the production of high-molecular compounds and, more particularly, to a process for producing colored polymer.

Said colored polymers find extensive use in various industries such as aircraft engineering, car manufacture, civil engineering, and the textile industry.

Known in the art is a process for producing colored polymers by way of a mechanical blending of a polymer such as polystyrene, polyvinylchloride, polyethylene with a dye comprising complexes of salts of copper, zinc, cobalt and cadmium with hydroxyaryltriazines.

However, it is impossible to produce, by this process, a polymer with a uniform distribution of a dyeing substance therewithin, though the polymers colored in this manner have a high heat-resistant and light-resistant coloration. To produce colored polymers with a high uniformity of coloration, e.g. optically uniform organic glass, another process is employed.

In this process an organic dye, for example pertaining to the class of anthraquinone dyes or hydroxystyryl pyridines, is dissolved in a monomer and the resulting mixture is subjected to a radical polymerization.

As a result, uniformly dyed polymers are obtained. However, due to an insufficient light-, heat-, and weather-resistance of the dyes employed, said polymers have a low heat-resistance and light-resistance of coloration.

Furthermore, said dyes actively react with other components of the system being polymerized, i.e. initiators and radical polymerization regulators, as well as free radicals conducting the polymerization process. This does not ensure the required controlled conditions for the polymerization process within predetermined ranges of parameters; this also impairs qualitative characteristics of the desired product.

It is an object of the present invention to provide such process for producing a colored polymer which would make it possible to produce a polymer possessing simultaneously high light-resistance, heat-resistance and uniformity of coloration.

This object is accomplished by a process for producing a colored polymer by way of polymerization of a vinyl monomer in the presence of a radical-type initiator and a coloring agent, wherein in accordance with the present invention as the coloring agent use is made of a sulphoxide, tributylphosphate, diisoamylphosphonate, trialkyl/aryl/phosphinoxide di-2-ethylhexylphosphoric acid complex of a colored metal chloride or metal nitrate.

The use of said coloring agents makes it possible to produce uniformly colored polymers with the color thereof defined by the choice of a respectively colored metal salt taking part in the complex-formation. It is also possible to use colored nitrates or chlorides of any metals capable of forming complexes with the above-mentioned organic ligands.

It is advisable to use said coloring agent in an amount of from 0.1 to 2.0% by weight. When added in an amount of below 0.1% by weight, the color intensity of the polymer is not pronouned. When added in an amount of about 2% by weight, the coloring agent exerts a plastifying effect on the resulting polymer.

It is preferable, for the purpose of the manufacture of light-filtering polymers, to make use of the following coloring agents: sulphoxide complexes of bivalent cobalt chloride, bivalent nickel nitrate and trivalent chromium nitrate.

The process according to the present invention resides in that the above-specified coloring agent is dissolved in a monomeric mixture (vinyl monomer, initiator, regulator) which is then subjected to polymerization of the radical type at temperatures specific for each particular initiator.

Said coloring agent exerts practically no effect on the polymerizations kinetics. For this reason, the process according to the present invention can be used without any changes of the technology of production of polymers by way of radical polymerization of vinyl monomer, while physico-chemical characteristics of the resulting polymers remain unchanged.

As the coloring agent use is made of sulphoxide, tributylphosphate, diisoamylphosphonate, trialkyl/aryl/phosphinoxide, di-2-ethylhexylphosphoric acid complex of a colored metal chloride or metal nitrate. The complex is prepared by intensively stirring an aqueous solution of a colored metal chloride or metal nitrate and a solution of said organic ligands in benzene taken in equimolar amounts at room temperature for the period of 0.5 hour. After stratification of the resulting mixture, the organic layer (the solution of said complex in benzene) is separated, the solvent is removed under vacuum and the resulting coloring agent is used for its application purpose.

The resulting colored polymeric materials are subjected to tests for heat- and light-resistance of the coloration. Since the employed complexes form molecular solutions in the vinyl monomer and the final polymer, the latter features a high degree of the color uniformity.

Light-resistance of the color of the resulting colored polymers has been evaluated spectrophotometrically by the variation of intensity of their coloration after exposure to UV-light over 50 hours. No changes of the coloration intensity have been observed.

For example, an organic glass based on methylmethacrylate containing as a coloring agent a complex of bivalent cobalt with two molecules of diamylsulphoxide has been exposed to the light of a quartz low-pressure lamp for 50 hours which resulted in no changes in the coloration intensity. At the same time, as a result of irradiation of an organic glass colored with an organic dye widely used in the art, i.e. "anthraquinone blue", the coloration intensity is reduced by two times after 5 hours of the exposure.

In the tests for a heat-resistance of the coloration, the colored polymers are subjected to the heat-treatment at the temperature of 180° C. for 6 hours. The coloration intensity is not changed. Furthermore, there is observed an increased heat-resistance of the resulting polymers.

Thus, polymethylmethacrylate containing 2.0% by weight of a complex [$CoCl_2.2(C_5H_{11})_2SO$] has the starting temperature of the decomposition of 280° C. and the temperature of intensive decomposition of 350° C. Meanwhile, the uncolored polymethylmethacrylate has the starting temperature of decomposition of 240° C. and the temperature of intensive decomposition of 295° C. At the same time, polymethylmethacrylate dyed with the organic dye "anthraquinone blue" has the starting decomposition temperature of 238° C. and the intensive decomposition temperature of 290° C.

It should be noted, in particular, that with the use of the process according to the present invention for the production of colored organic glass, the latter has excellent spectral characteristics defined by a narrow region of the light absorption by metal salts which is of a great value in the manufacture of light-filters.

Other physico-mechanical characteristics of the colored polymers produced in accordance with the present invention, remain unchanged owing to a minor amount of the coloring agent incorporated in the polymer.

For a better understanding of the present invention, some specific examples illustrating the production of a colored polymer are given hereinbelow.

EXAMPLE 1

A mixture with the total weight of 5 kg consisting of a diamylsulphoxide complex of bivalent cobalt chloride $CoCl_2.2\ [(C_5H_{11})_2SO]$ taken in the amount of 50 g, benzoyl peroxide of 2.5 g and methylmethacrylate being the balance, is placed into a mould made of a silicate glass and polymerized at the temperature of 60° C. for 8 hours. Then a post-polymerization is conducted at the temperature of 120° C. for 6 hours to give a transparent optically uniform organic glass having a blue color.

The coloration of samples of the resulting polymethylmethacrylate (spectral characteristics) remains unchanged after a heat-treatment (at the temperature of 180° C. for 6 hours) and UV-irradiation (lamp IIPK-2 M, distance to the sample 10 cm, temperature 20° C., 50 hours). The starting temperature of decomposition of the thus-colored polymethylmethacrylate is 285° C., the temperature of its intensive decomposition is 330° C.

EXAMPLE 2

The mode of the production of colored polymethylmethacrylate is similar to that described in Example 1 hereinabove, except that as the coloring agent use is made of a tributylphosphate complex of bivalent cobalt chloride in the amount of 1% by weight.

There is obtained a transparent optically uniform organic glass having a blue color.

The color of samples of the resulting polymethylmethacrylate remains unchanged after a heat-treatment (at the temperature of 180° C. for 6 hours) and UV-irradiation (lamp IIPK-2M, distance to the sample 10 cm, temperature 20° C., 50 hours). The starting point of decomposition of the thus-colored polymethylmethacrylate is 290° C., the temperature of intensive decomposition of the polymer is 320° C.

EXAMPLE 3

The mode of the production of colored polymethylmethacrylate is similar to that described in Example 1, except that as the coloring agent use is made of a diisoamylphosphonate complex of bivalent cobalt nitrate

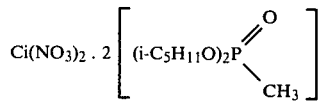

taken in the amount of 1% by weight. A transparent optically uniform organic glass is thus obtained which has a pink color. The colour of samples of the resulting polymethylmethacrylate remains unchanged after a heat-treatment (at the temperature of 180° C. for 6 hours) and UV-irradiation (lamp IIPK-2 M, distance to the sample 10 cm, temperature 20° C., 50 hours). The starting temperature of decomposition of the colored polymethylmethacrylate is 285° C., the temperature of its intensive decomposition is 325° C.

EXAMPLE 4

The mode of the production of colored polymethylmethacrylate is similar to that described in Example 1, except that as the colored use is made of a triphenylphosphinoxide complex of bivalent cobalt nitrate $Co(NO_3)_2.2\ ](C_6H_6)_3PO]$ in the amount of 1% by weight.

A transparent optically uniform organic glass with a pink color is obtained.

The color of samples of the resulting polymethylmethacrylate remains unchanged after a heat-treatment (at the temperature of 180° C. for 6 hours) and UV-irradiation (lamp IIPK-2M, distance to the sample 10 cm, temperature 20° C., 50 hours). The starting temperature of decomposition of the colored polymethylmethacrylate is 290° C., the temperature of its intensive decomposition is 330° C.

EXAMPLE 5

The mode of the production of colored polymethylmethacrylate is similar to that described in Example 1, except that as the coloring agent use is made of a di-2-ethylhexylphosphoric acid complex of bivalent cobalt nitrate

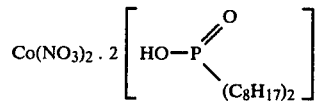

in the amount of 1% by weight.

A transparent optically uniform organic glass with a pink color is obtained. The color of samples of the colored polymethylmethacrylate remains unchanged after a heat-treatment (at the temperature of 180° C. for 6 hours) and UV-irradiation (lamp IIPK-2M, distance to the sample 10 cm, temperature 20° C., 50 hours). The starting temperature of decomposition of the colored polymethylmethacrylate is 280° C., the temperature of its intensive decomposition is 310° C.

EXAMPLE 6

The mode for the production of colored polymethylmethacrylate is similar to that described in Example 1, except that as the coloring agent use is made of a diamylsulphoxide complex of trivalent chromium nitrate $Cr(NO_3)_3.3\ [(C_5H_{11})_2SO]$ in the amount of 1% by weight.

A transparent optically uniform organic glass is obtained having a green color.

The color of samples of the resulting polymethylmethacrylate remains unchanged after a heat-treatment (at the temperature of 180° C. for 6 hours) and UV-irradiation (lamp IIPK-2M, the distance to the sample 10 cm, the temperature 20° C., 50 hours). The starting temperature of decomposition of the colored polymethylmethacrylate is 260° C., the temperature of its intensive decomposition is 300° C.

EXAMPLE 7

The mode of the production of colored polymethylmethacrylate is similar to that described in Example 1 hereinbefore, except that as the coloring agent use is made of a tributylphosphate complex of trivalent chromium chloride CrCl$_3$.3 [(C$_4$H$_9$O)$_3$] in the amount of 1% by weight.

A transparent optically uniform organic glass with a green color is thus obtained.

The color of the resulting polymethylmethacrylate remains unchanged after a heat-treatment (at the temperature of 180° C. for 6 hours) and UV-irradiation (lamp IIPK-2M, the distance to the sample is 10 cm, temperature 20° C., 50 hours). The starting temperature of decomposition of the colored polymethylmethacrylate is 270° C., the temperature of its intensive decomposition is 310° C.

EXAMPLE 8

The mode of the production of colored polymethylmethacrylate is similar to that described in Example 1, except that as the coloring agent use is made of a dihenylsulphide complex of nickel nitrate Ni(NO$_3$)$_2$.2 [(C$_6$H$_{13}$)$_2$SO] in the amount of 0.5% by weight.

An optically uniform organic glass is thus obtained which is of a green color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 280° C., the temperature of its intensive decomposition is 320° C.

EXAMPLE 9

A mixture of the total weight of 1 kg consisting of a coloring agent i.e. a complex of bivalent cobalt chloride with two molecules of diisoamylsulphoxide in the amount of 10 g, benzoyl peroxide in the amount of 10 g, styrene being the balance, is set under vacuum and polymerized in a mould made of silicate glass at the temperature of 60° C. for 12 hours and then post-polymerized for 5 hours at the temperature of 130° C. to give a uniformly colored blue polystyrene.

The color of samples of the resulting polystyrene remains unchanged after a UV-irradiation (lamp IIPK-2M, the distance to the sample 20 cm, temperature 20° C., 30 hours). The starting temperature of decomposition of the colored polystyrene is 300° C. and the temperature of its intensive temperature is 350° C.

EXAMPLE 10

The mode of production of colored polystyrene is similar to that described in the foregoing Example 9, except that as the coloring agent use is made of di-2-ethyl-hexylphosphoric acid complex of nickel chloride

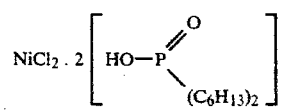

in the amount of 0.3% by weight. There is obtained a uniformly colored green polystyrene.

The color of samples produced from the resulting polystyrene remains unchanged after UV-treatment (lamp IIPK-2M, the distance to the sample 20 cm, temperature 20° C., 30 hours). The starting temperature of decomposition of the colored polystyrene is 290° C., the temperature of its intensive decomposition is 345° C.

EXAMPLE 11

The mode of production of colored polystyrene is similar to that of Example 9 hereinbefore, except that as the coloring agent use is made of a dihexylsulphoxide complex of manganese chloride MnCl$_2$.2 [(C$_6$H$_{13}$)$_2$SO] in the amount of 1.5% by weight. There is obtained a uniformly colored pink polystyrene.

The color of samples produced from the resulting polystyrene remains unchanged after UV-irradiation (lamp IIPK-2M, the distance to the sample 20 cm, temperature 20° C., 30 hours). The starting temperature of decomposition of the colored polystyrene is 295° C., the temperature of its intensive decomposition is 350° C.).

EXAMPLE 12

The mode of the production of colored polystyrene is similar to that described in Example 9, except that as the coloring agent use is made of a dihexylsulphoxide complex of niobium chloride NbCl$_5$.3 [(C$_6$H$_{13}$)$_2$SO] in the amount of 0.2% by weight. There is obtained a uniformly-colored yellow polystyrene.

The color of samples produced from the resulting polystyrene remains unchanged after UV-irradiation (lamp IIPK-2M, the distance to the sample 20 cm, temperature 20° C., 30 hours). The starting temperature of decomposition of the colored polystyrne is 300° C., the temperature of its intensive decomposition is 350° C.

EXAMPLE 13

A mixture consisting of 30 g of acrylonitrile, 0.05% by weight of benzoyl peroxide, 2% by weight of a complex of cobalt chloride with two molecules of diamylsulphoxide CoCl$_2$.2 [(C$_5$H$_{11}$)$_2$SO] is charged into an ampule, set under vacuum, sealed and polymerized at the temperature of 50° C. for three hours. Then the ampule is opened, the precipitated polyacrylonitrile is filtered-off, thoroughly washed on filter with petroleum ether; reprecipitated from dimethylformamide into petroleum ether and dried in vacuum at a temperature of from 30° to 40° C. to a constant weight. There is obtained a powder of polyacrylonitrile having a bluish tint and the softening point of 135° C. Filaments drawn from a melt of this polymer have a blue color.

EXAMPLE 14

The mode of the production of polyacrylonitrile is similar to that described in the foregoing Example 13, except that as the coloring agent use is made of a tributylphosphate complex of cobalt chloride CoCl$_2$.2 [(C$_4$H$_9$O)$_3$PO] in the amount of 0.2% by weight. There is obtained a powder of polyacrylonitrile having a blue color and the softening point of 145° C. Filaments drawn from a melt of this polymer are of a bluish color.

EXAMPLE 15

Polyacrylonitrile is produced by the method similar to that of Example 13, except that as the coloring agent use is made of a trioctylphosphinoxide complex of molybdenum, chloride in the amount of 2% by weight. There is obtained a powder of polyacrylonitrile having a green tint and the softenig point of 140° C. Filaments drawn from a melt of this polyacrylonitrile have a green color.

EXAMPLE 16

Polyacrylonitrile is produced by the method similar to that of Example 13, except that as the coloring agent use is made of a dihexylsulphoxide complex of palladium chloride $PdCl_2.2\ [(C_6H_{13})_2SO]$ in the amount of 0.5% by weight. There is obtained a powder of polyacrylonitrile having a yellow tint and the softening point of 150° C. Filaments drawn from a melt of this polyacrylonitrile have a yellowish color.

EXAMPLE 17

A mixture with the total weight of 1 kg consisting of a dye, i.e. a tributylphosphate complex of cobalt nitrate $Co(NO_3)_2.2\ [(C_4H_9O)_3PO]$ in the amount of 10 g, dicyclohexylperoxidecarbonate 0.1 g, vinylacetate being the balance, is set under vacuum and polymerized at the temperature of 40° C. for three hours. The precipitated polyvinylacetate is filtered off, thoroughly washed on filter with petroleum ether, reprecipitated from dimethylformamide into petroleum ether and dried in vacuum at a temperature within the range of from 30 to 40° C. to a constant weight to give a powder of polyvinylacetate having a pink tint, the softening temperature is 145° C.

EXAMPLE 18

The process for producing colored polybutylacrylate is similar to that described in Example 9 hereinbefore, except that as the coloring agent use is made of a dihexylsulphoxide complex of molybdenum chloride $MoCl_5.3\ [(C_6H_{13})_2SO]$ in the amount of 2.0% by weight dissolved in the monomer, i.e. butylacrylate. There is obtained a uniformly-colored green polybutylacrylate. The color of samples produced from the resulting polybutylacrylate remains unchanged after UV-irradiation (lamp IIPK-2M, the distance to the sample 20 cm, temperature 20° C., 30 hours). The starting temperature of decomposition of the colored polybutylacrylate is 240° C., the temperature of its intensive decomposition is 300° C.

EXAMPLE 19

The process for the production of colored polymethylmethacrylate is similar to that described in Example 1, except that as the dye use is made of a triphenylphosphinoxide complex of uranyl nitrate $(UO_2)(NO_3)_2.2\ [(C_6H_5)_3PO]$ in the amount of 2% by weight. There is obtained a transparent optically-uniform organic glass having a yellowish-green color. The colour of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 285° C., the temperature of its intensive decomposition is 330° C.

EXAMPLE 20

The process for the production of colored polymethylmethacrylate is similar to that described in Example 1, except that as the coloring agent use is made of a diamylsulphoxide complex of uranium chloride $UCl_4.3\ [(C_5H_{11})_2SO]$ in the amount of 1.0% by weight. There is obtained a transparent optically uniform organic glass of a green color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 290° C., the temperature of its intensive decomposition is 325° C.

EXAMPLE 21

The process for producing colored polymethylmethacrylate is similar to that described in Example 1, except that as the coloring agent use is made of a tributylphosphate complex of selenium chloride $SeCl_4.2\ [(C_4H_9O)_3PO]$ in the amount of 0.5% by weight. There is obtained a transparent optically uniform organic glass having a dark-brown color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 280° C., the temperature of its intensive decomposition is 320° C.

EXAMPLE 22

The process for the production of colored polymethylmethacrylate is similar to that described in Example 1, except that as the coloring agent use is made of a di-2-ethylhexylphosphoric acid complex of molybdenum chloride $MoCl_5.3\ [HOP(O)(C_8H_{17})_2]$ in the amount of 0.3% by weight. There is obtained a transparent optically uniform organic glass of a green color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 280° C., the temperature of its intensive decomposition is 320° C.

EXAMPLE 23

The process for producing colored polymethylmethacrylate is similar to that described in Example 1, except that as the coloring agent use is made of a diamylsulphoxide complex of niodium nitrate $Nd(NO_3)_3.3\ [(C_5H_{11})_2SO]$ in the amount of 2.0% by weight. There is obtained a transparent optically uniform organic glass having a blue color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 280° C., the temperature of its intensive decomposition is 320° C.

EXAMPLE 24

The process for producing colored polymethylmethacrylate is similar to that described in Example 1, except that as the coloring agent use is made of a diamylsulphoxide complex of cerium nitrate $Ce(NO_3)_4.4\ [(C_5H_{11})_2SO]$ in the amount of 2.0% by weight. There is obtained a transparent optically uniform organic glass having an orange color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature of 20° C., 50 hours). The starting temperature of decomposition of the colored polymethylmethacrylate is 285° C., the temperature of its intensive decomposition is 325° C.

EXAMPLE 25

The process for producing colored polymethylmethacrylate is similar to that described in Example 1, except that as the coloring agent use is made of a cyclohexylsulphoxide complex of ferric nitrate $Fe(NO_3)_3.3[(C_6H_{10})SO]$ in the amount of 0.1% by weight. There is obtained a transparent optically uniform organic glass having a dark-brown color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 250° C., the temperature of its intensive decomposition is 300° C.

EXAMPLE 26

The process for producing colored polymethylmethacrylate is similar to that described in Example 1, except that as the coloring agent use is made of a cyclohexylsulphoxide complex of trivalent iron chloride $FeCl_3.3[(C_6H_{10})SO]$ in the amount of 0.1% by weight. There is obtained a transparent optically uniform organic glass having a brown color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 250° C., the temperature of its intensive decomposition is 300° C.

EXAMPLE 27

The process for producing colored polymethylmethacrylate is similar to that described in Example 1 hereinbefore, except that as the coloring agent use is made of a cyclohexylsulphoxide complex of vanadium chloride $VCl_5.3[(C_6H_{10})SO]$ in the amount of 0.5% by weight. There is obtained a transparent optically uniform organic glass having a yellow-green color.

The color of samples produced from the resulting polymethylmethacrylate remains unchanged after a heat-treatment (at the temperature of 180° C. for 6 hours) and UV-irradiation (lamp IIPK-2M, the distance to the sample 10 cm, temperature 20° C., 50 hours). The starting temperature of decomposition of the colored polymethylmethacrylate is 250° C., the temperature of its intensive decomposition is 300° C.

EXAMPLE 28

The process for producing colored polymethylmethacrylate is similar to that described in Example 1, except that as the coloring agent use is made of a diisoamulphosphonate complex of aurum chloride

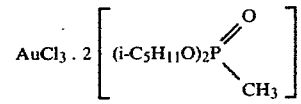

in the amount of 0.2% by weight. There is obtained a transparent optically uniform organic glass having an orange color. The color of samples produced from the resulting polymethylmethacrylate remains unchanged after a heat-treatment (at the temperature of 180° C. for 6 hours) and UV-irradiation (lamp IIPK-2M, the distance to the sample is 10 cm, temperature 20° C., 50 hours). The starting temperature of decomposition of the colored polymethylmethacrylate is 250° C., the temperature of its intensive decomposition is 305° C.

What is claimed is:

1. A process for producing a colored polymer, which comprises polymerizing a vinyl monomer in the presence of a radical initiator and a coloring agent which is a complex made by reacting a metal chloride or metal nitrate with organic compounds selected from the group consisting of an organic sulphoxide, tributylphosphate, trialkyl/aryl/phosphinoxide, and di-2-ethylhexylphosphoric acid.

2. A process as claimed in claim 1, wherein said coloring agent is used in an amount of from 0.1 to 2% by weight.

3. A process as claimed in claim 1, wherein as the coloring agent a sulphoxide complex of bivalent cobalt chloride is used.

4. A process as claimed in claim 1, wherein as the coloring agent a sulphoxide complex of bivalent nickel nitrate is used.

5. A process as claimed in claim 1, wherein a sulphoxide complex of trivalent chromium nitrate is used as the coloring agent.

* * * * *